Figure 1:
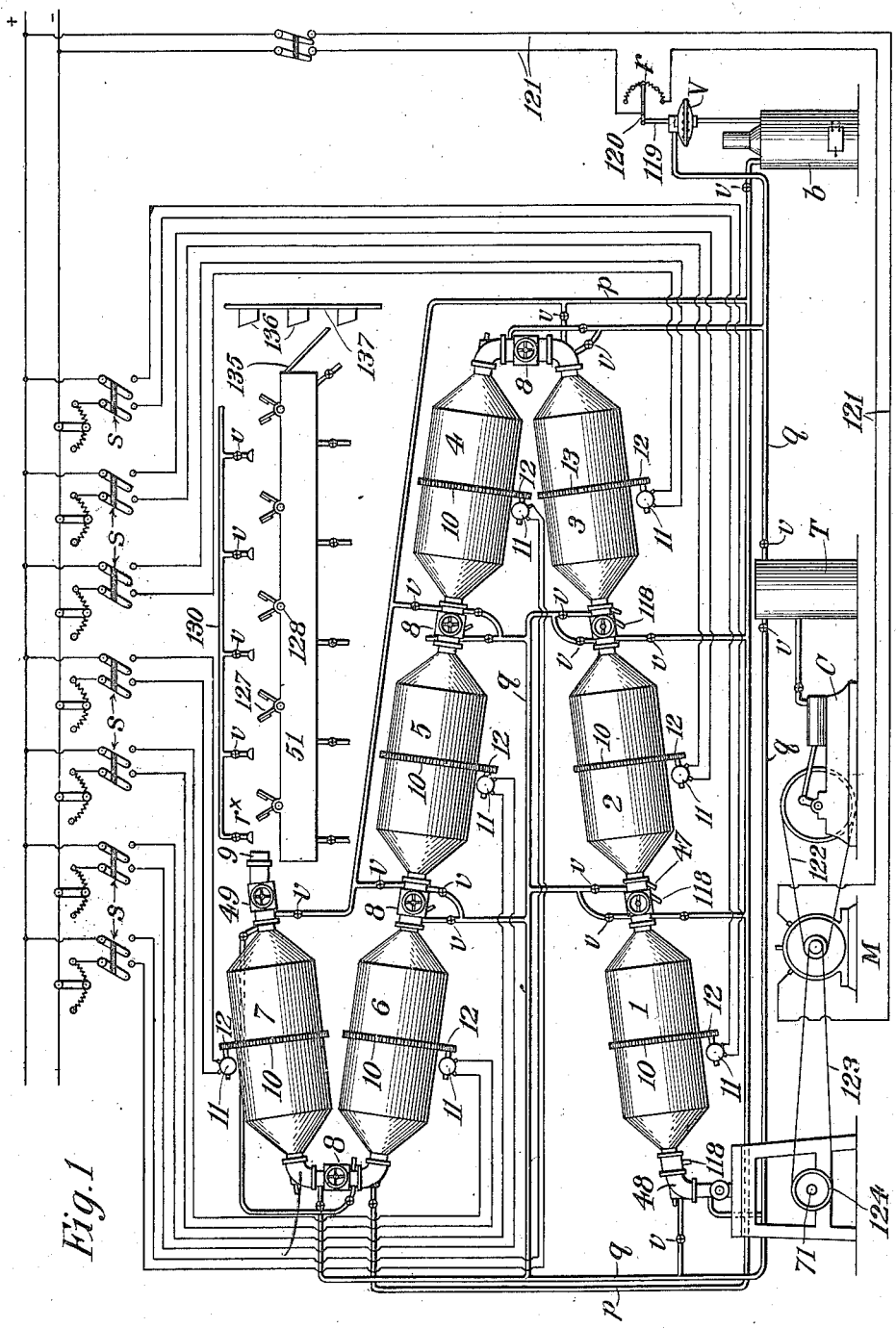

W. K. FREEMAN.
PROCESS FOR OBTAINING FIBER FROM WOOD AND OTHER SUBSTANCES.
APPLICATION FILED NOV. 25, 1913.

1,186,655.  Patented June 13, 1916.
9 SHEETS—SHEET 1.

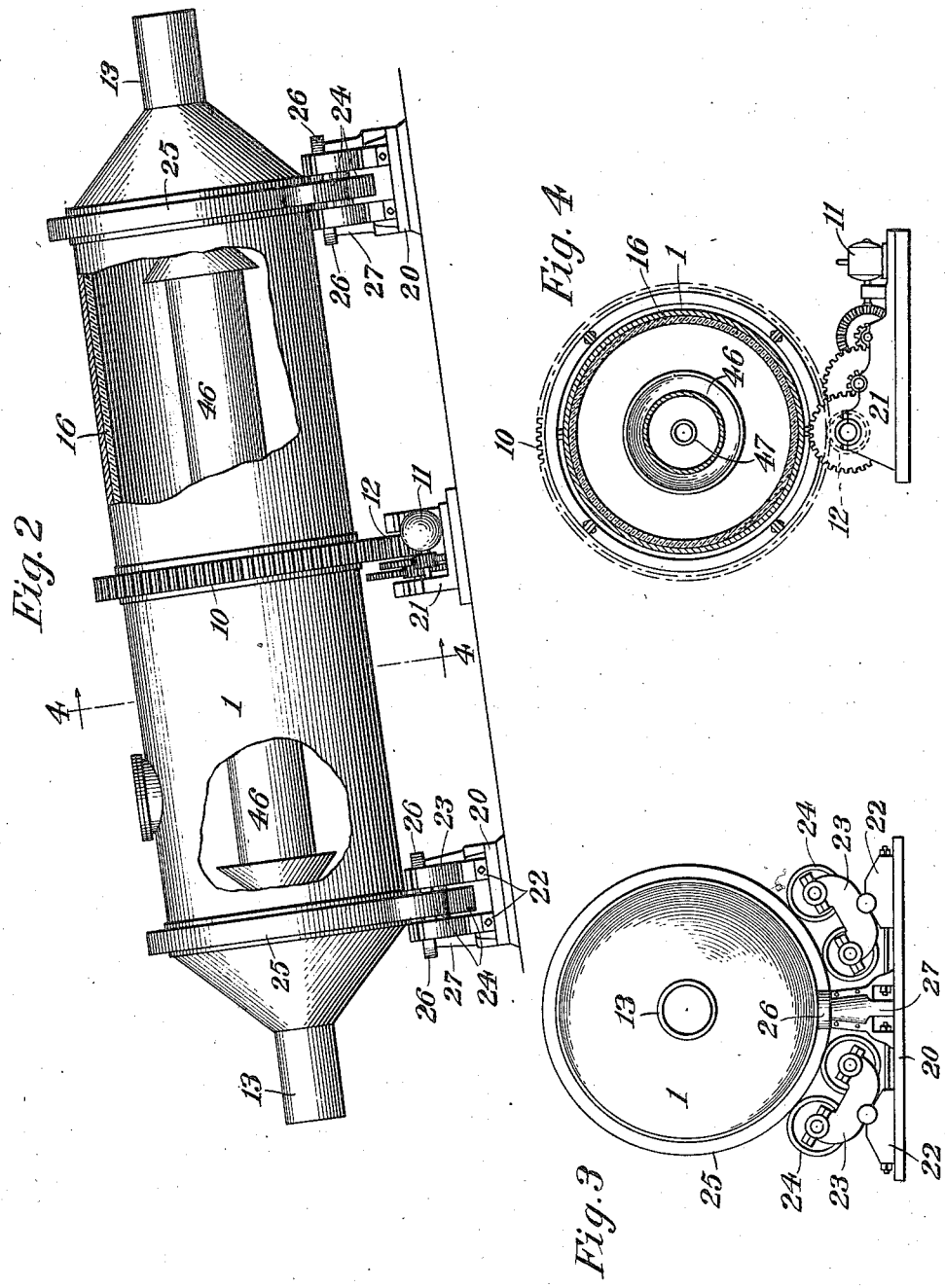

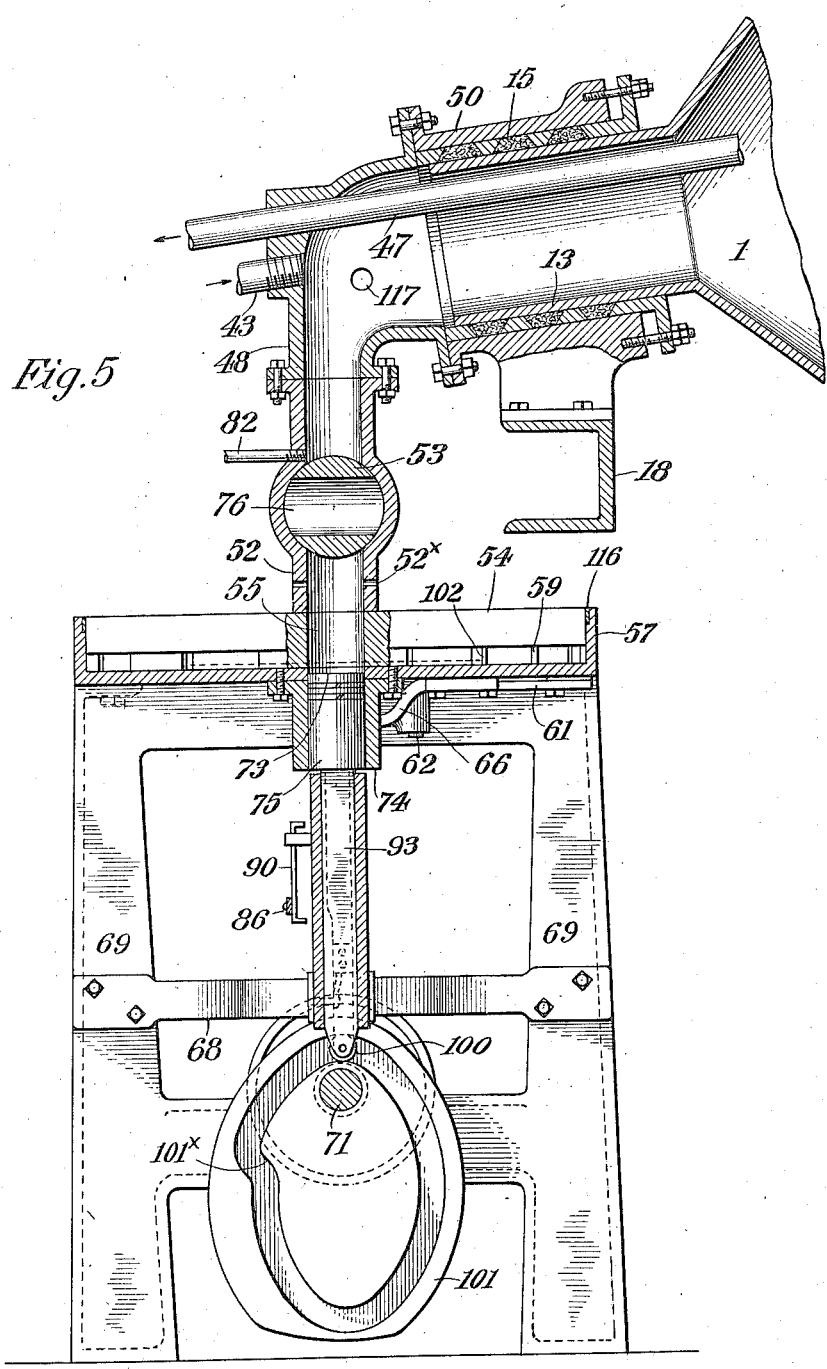

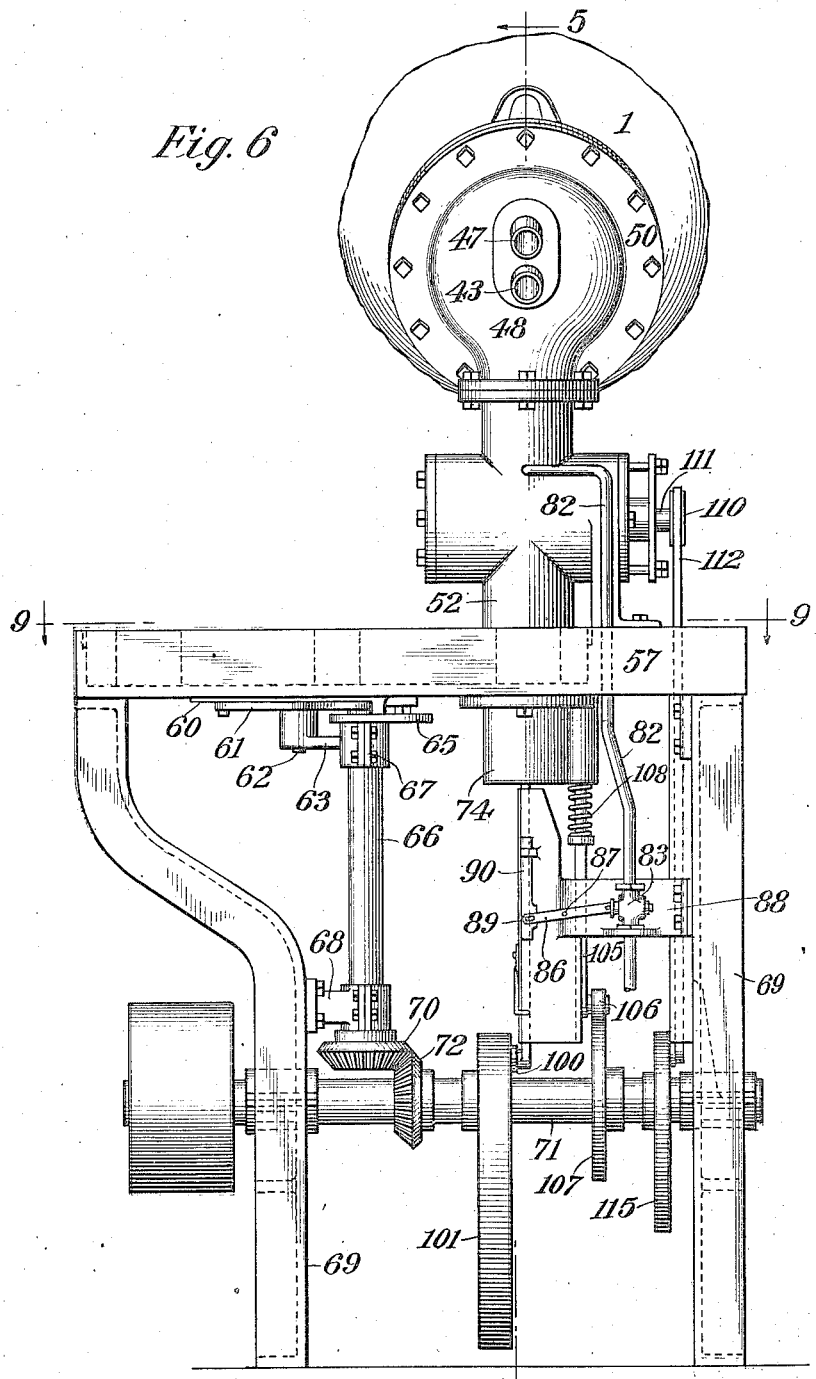

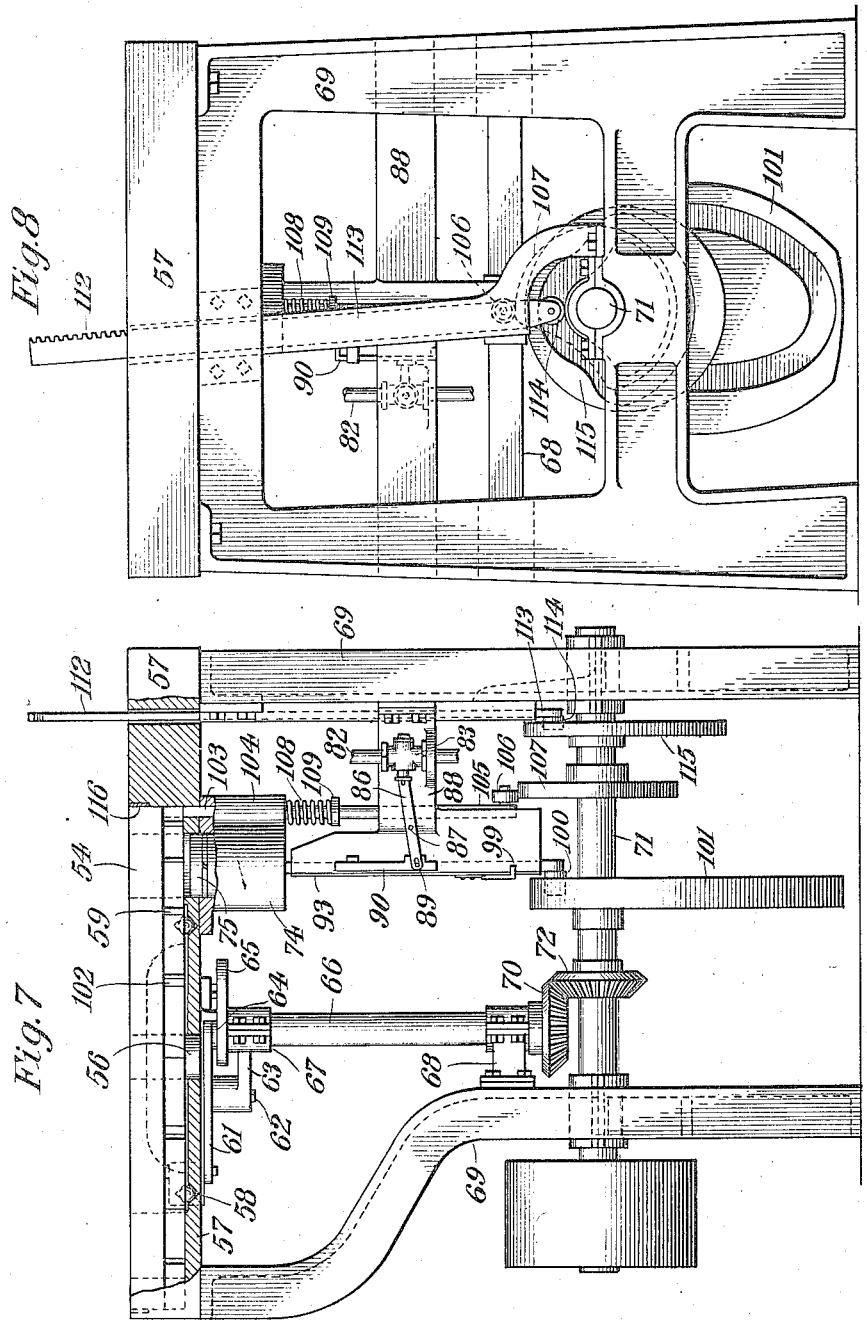

W. K. FREEMAN.
PROCESS FOR OBTAINING FIBER FROM WOOD AND OTHER SUBSTANCES.
APPLICATION FILED NOV. 25, 1913.
1,186,655.
Patented June 13, 1916.
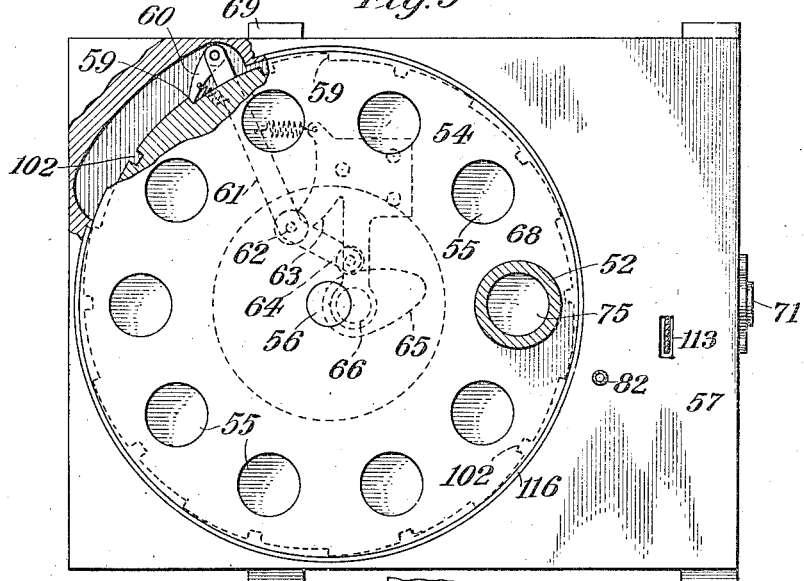
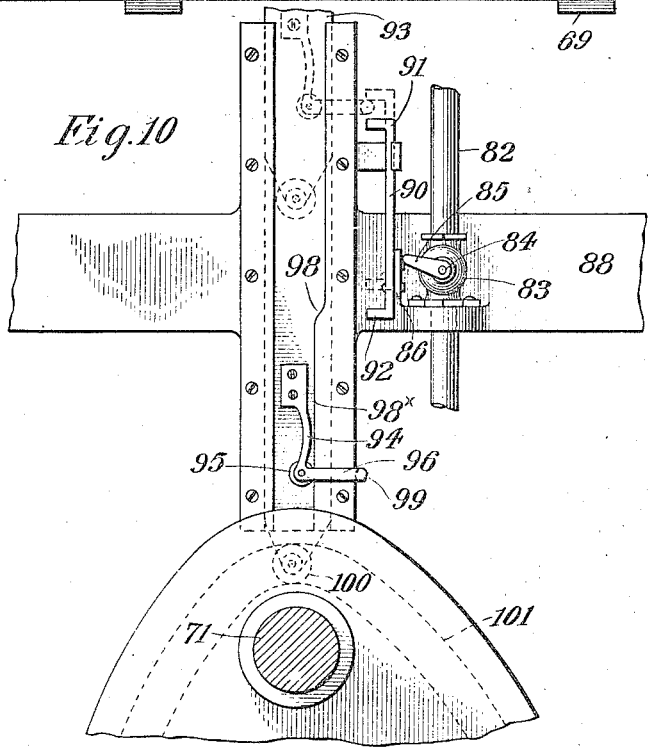

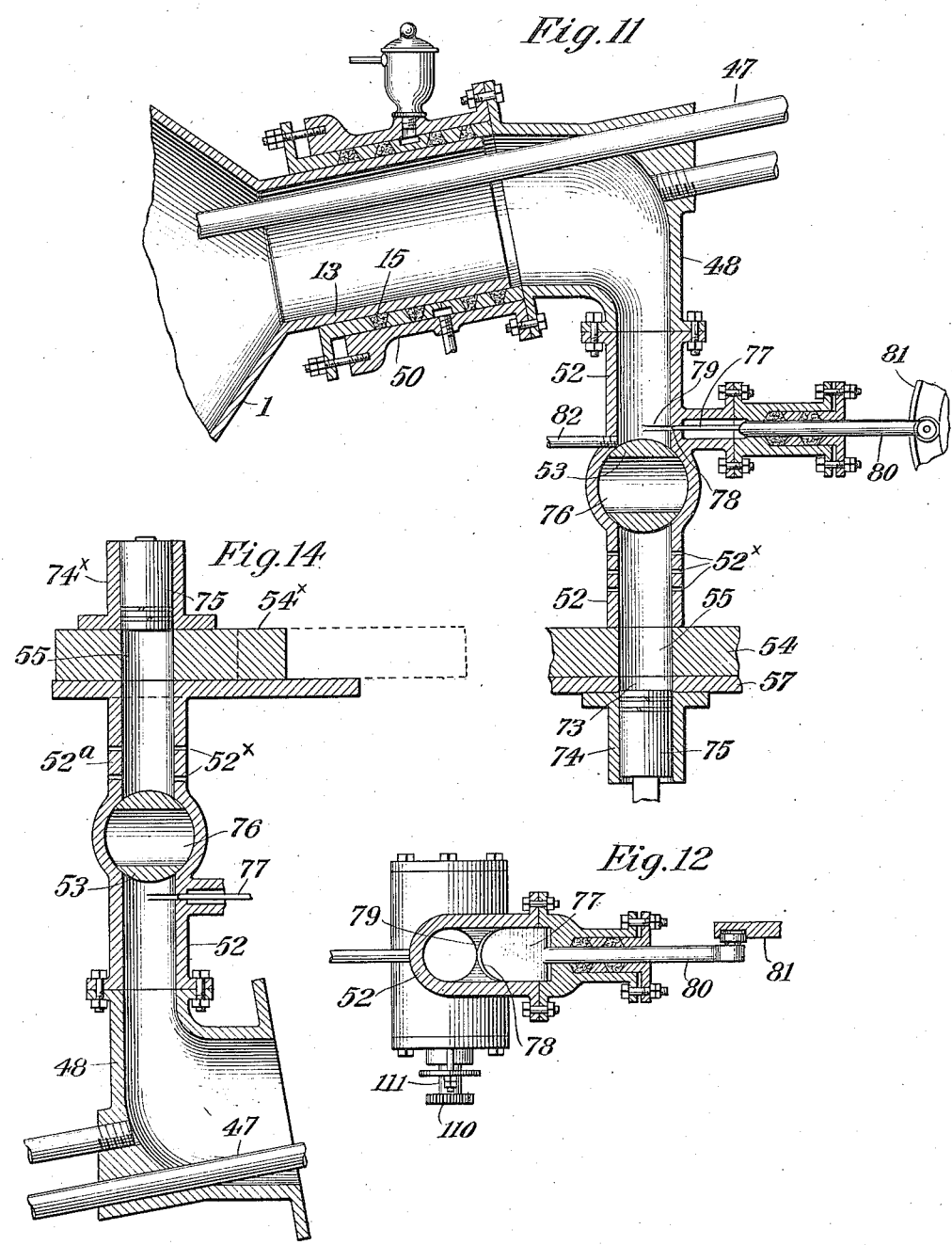

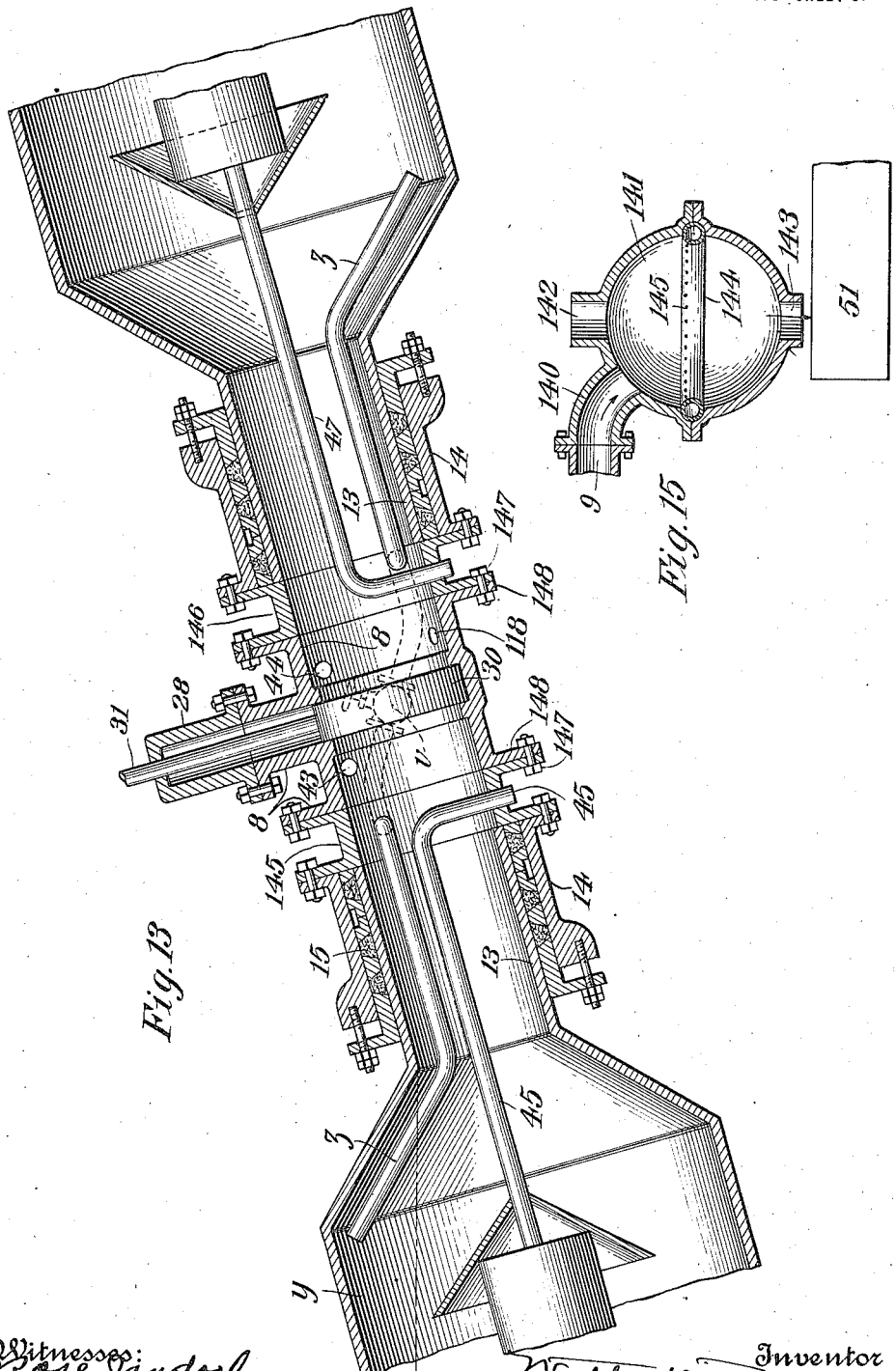

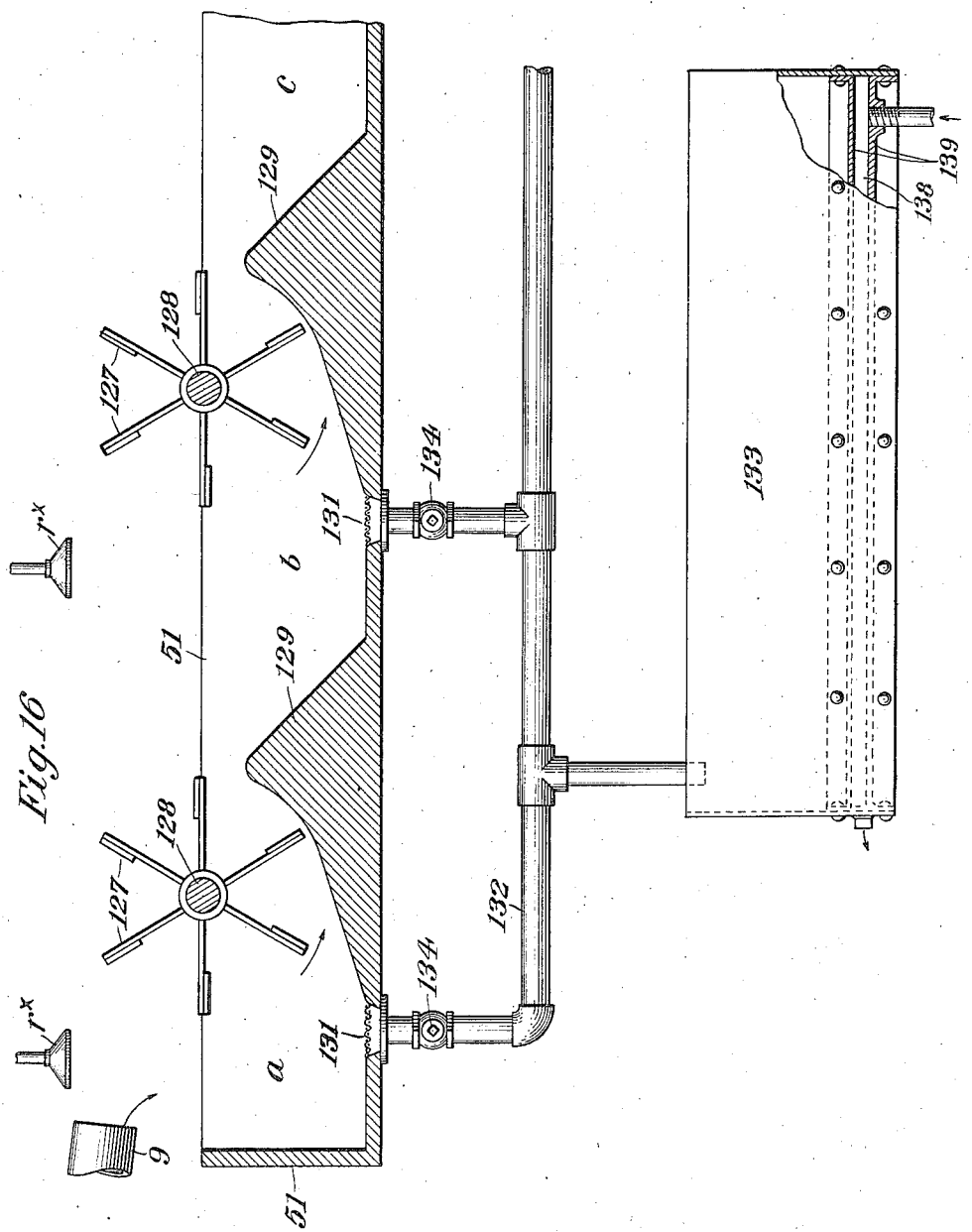

UNITED STATES PATENT OFFICE.

WALTER K. FREEMAN, OF OSCAWANA, NEW YORK, ASSIGNOR TO HYDROLOSE PROCESS CORPORATION, A CORPORATION OF NEW YORK.

PROCESS FOR OBTAINING FIBER FROM WOOD AND OTHER SUBSTANCES.

1,186,655.     Specification of Letters Patent.     Patented June 13, 1916.

Application filed November 25, 1913. Serial No. 803,045.

*To all whom it may concern:*

Be it known that I, WALTER K. FREEMAN, a citizen of the United States, residing at Oscawana, in the county of Westchester and State of New York, have invented certain new and useful Improvements in Processes for Obtaining Fiber from Wood and other Substances; and I do hereby declare the following to be a full, clear, and exact description of the invention, such as will enable others skilled in the art to make the apparatus and make use of the same.

According to the present day method of manufacturing pulp for paper-making, chips of wood are charged into a digester with chemical solutions and the digester is hermetically sealed. The contents thereof are then heated for several hours by means of direct or indirect steam, and when the wood is cooked sufficiently it is blown out into the blow-pit and washed. It is well-known in the art that it is impossible by this method to secure two batches of pulp that are alike, that no two digesters will yield pulp of precisely the same character or color, and that no single digester will yield a uniform quality of pulp. When the pulp, treated as above set forth, is removed from the digester to the blow-pit, it may be "hair" or "lumpy" or badly discolored, and there exists no method or means for ascertaining in advance of the blowing-out step the condition of the pulp in the digester. If the cellulose fiber has been acted upon too much by heat and chemical or either of these factors, it will not felt into paper, or will do so more or less imperfectly, being "hairy." Or, if it has been acted upon insufficiently it is "lumpy" and is practically useless for paper-making purposes, unless it is carefully worked up by beating or by some mechanical means. Again the sulfurous element of the solution, when bisulfite of lime or magnesium is used, may separate therefrom, and thereby reduce the activity of chemicals to an unknown degree; sometimes the sulfurous gases thus separating from the solution are conveyed to a milk of lime tank and so are saved, but this does not remedy the evil caused by their separation, or in any way compensate for the diminished chemical value of the weakened solution. Although attempts have been made to remedy this defect by drawing from a digester in action samples of the liquor and testing it to find its specific gravity, etc., and thus enable one to attempt to correct any inaccuracies in the strength of the solution or degree of digestion, yet the consensus of opinion in the art is that there is nothing reliable in such method of testing, and restrengthening of the solutions. The thing required to be known is the condition of the pulp, not the condition of the solution, yet it is the condition of the latter that is tested, so the said consensus would appear to be correct. Moreover, the aforesaid process is wasteful of the cellulose fiber or cell-stuff of the wood available for paper-making purposes. This great loss of cellulose fiber appears to be due in large measure to the high temperature, comparatively short time of digestion of the wood and cooking in rather than out the intercellular substances, whereby much of the available cell-stuff or cellulose fiber is dissolved and passes into solution with the chemicals and so is lost. That is to say, the present day process of digestion, which takes place at one step or stage at high temperature, under fixed conditions, and with strong chemicals, does not allow for the proper distribution of the heat and the chemicals to thoroughly penetrate the wood, causing a loss of over fifty (50) per cent., as above pointed out. When the content of the digester is blown into the blow-pit as above stated, cold water is sprayed on it for the purpose of washing, cooling and cleansing the pulp. This requires a great quantity of water in order to dilute and remove the chemicals with any degree approaching completeness, and the waste and spent chemicals are turned into the streams, carrying with them the chemicals and much of the wood constituents.

The primary object of the present invention is the recovery of a larger proportion of the available cellulose fiber for paper-making than is effected by the prior methods in commercial use, and to have it of substantially uniform character, color and quality, as well as to reduce the cost of production.

According to the present invention, the mixed chemicals and raw material are flowed past and in contact with a number of independent heating-surfaces and are heated thereat, the heat of each surface being under the control of the operator who may vary it should such a step be found advisable by testing the condition of the material being digested. The flow may be continuous or it may be intermitted at any stage in order that the cooking may be prolonged, and then be resumed, and this as often as may be necessary. The distribution of the heat through the mass may be rendered more uniform by agitating the mass otherwise than by the flowing motion, which motion is relatively a slow one, as by rotating the digester more or less rapidly, the air may be bubbled through the mass of material and solution as an aid in the process.

Instead of throwing a great bulk of the raw material into the digester along with the solution, and then hermetically sealing the digester and heating, I deliver the raw material and the chemicals mixed little by little into a digester and cause it to flow the same through it (heating it the while) into a second digester and so on through a series or number of connected digesters, each of which digesters, has its own individual heating-apparatus, the mass of material flowing through the digesters passing along and in contact with such heaters.

In the step of feeding in the raw material, I use one or more feed-pipes which open to the admission port of the first digester of the series, and force in the raw material by little and little continuously or intermittently through such pipe or pipes, at the same time admitting the proper amount of the chemicals. I may, and preferably do, at the same time force in some gases, and I remark that a gas may be introduced at any stage of the operation, or at any digester in the series, for the purposes of reducing the mass or otherwise promoting the process. Thus chlorin may be introduced toward the end of the process for the purpose of bleaching the material. The digester material and the chemicals are discharged from the last digester of the series into a beater and are there sprayed with cold water and beaten or washed, such beater being provided with a number of baffles and several beating appliances and with means for drawing off at certain of said baffles the stronger liquids containing the chemicals and the dissolved constituents of the raw material used, while the pulp matter passes over baffle after baffle and finally is discharged, being beaten at each baffle and also sprayed there with cold water to complete the washing process. The discharged pulp is drained and used for making paper, boards, vessels of all kinds, and generally, for any purpose for which paper or wood is now used. In order to more thoroughly prepare the pulp matter for the uses to which it is to be applied, the temperature of the later digesters may be lowered somewhat from that used in the earlier digesters of the series while the strength of the solutions or chemicals may be increased, and in the next to the last digester of the series I prefer to treat the pulp matter so that in the last digester of the series the pulpy matter will the more readily disintegrate and blend into a uniform consistency and be discharged in a disintegrated or separated and evenly divided condition. The agitating or mixing action in the various digesters may be more or less intense as conditions may require, each digester being provided, preferably with means by which samples of the pulpy material therein may be drawn off for being tested to ascertain its condition. Any sulfurous gases that may separate, pass through with the steam, vapor and other gases. While, for the purposes of definiteness of conception, I have thus far referred only to the sulfite process, it must be understood that the process and apparatus can be used in other processes of making wood or other pulp.

In order that the new process may be the more readily comprehended, I have elected to describe it in connection with a form of apparatus adapted to carry it into effect, and such apparatus is illustrated in the accompanying drawing, forming part hereof, in which—

Figure 1 is a diagrammatic representation, with some details omitted, of the entire apparatus. Fig. 2 is a side elevation, partly in section and broken away, of a digester and its mounting for rotation. Fig. 3 is an end elevation of the same; Fig. 4 is a section thereof on the plane 4—4 of Fig. 2. Fig. 5 is a sectional elevation of a feed apparatus; Fig. 6 is an end elevation of the same; Fig. 7 is a sectional elevation of the feed-apparatus operating mechanism; Fig. 8 is another view of the same; Fig. 9 is a plan view on the plane 9—9 of Fig. 6; Fig. 10 is an elevation, on a larger scale, of mechanism shown in other views; Fig. 11 is a sectional elevation of a modified form of feed-apparatus; Figs. 12 and 14 are sections of the last-named on the plane of the detent-plate hereinafter described. Fig. 13 is a section through the joint or connecting means between two digesters; and Fig. 15 is a section of the pulp-washing or watering device which I sometimes may use between the discharge pipe 9 and the beater 51. Fig. 16 is a longitudinal view, partly in section, of a beating apparatus and apparatus for evaporating.

In the drawings, Fig. 1 the reference symbols 1, 2, 3, 4, 5, 6, and 7, indicate as many rotary digesters joined in series by the tubular connections 8, which connections are shown in detail in Fig. 13. While for convenience, the digesters are shown in the diagram, Fig. 1, as causing the material and chemicals to rise through them from digester 1 to digester 2 and thence to digesters 3 and so on to the discharge nozzle 9 of digester 7, it must be understood that this is merely one arrangement of the apparatus and that the apparatus may be arranged otherwise without departing from my invention. The digesters shown are cylindrical in form and are provided with conical ends, and each digester is mounted for independent rotation about its longitudinal axis, and is provided with a ring gear 10 thereabout, whereby it may be rotated by any suitable means, as, for instance, electric motor 11 and pinion 12. The conical ends of the digesters terminate in tubes 13 which telescope with tubes 14 forming part or attached to the tubular connections 8 aforesaid, suitable glands and packing 15 being provided to prevent leakage. The digesters are formed of or are lined with acid-resisting material, as are all parts coming in contact with the chemicals used in the process; such a lining is shown at 16 in Fig. 2.

Pipes 43, 44 open through the walls of the connections 8 at opposite sides of the valve-seat 28 and are used for the admission of gases under pressure. The reference 45 marks a pipe for the admission of live steam to the steam-drums 46 in the digesters, the drum 46 and its pipe 45 for each digester being independent of the like parts of each of the other digesters, while the reference 47 marks the outlet pipes from said drums, and pipes 45 and 47 for adjacent digesters passing through the walls of the connections 8 at opposite sides of the valves 30. At the first digester of the series, the pipe 47 passes out through the walls of the tube 48 through which the raw material passes to the admission-port (tube 13) of the first digester, while, at the last digester of the series, the pipe 45 enters through the bearing 49 for the end-tube of that digester.

It will be noted that each digester has its own individual heating apparatus and connections, so that the heat-conditions in any and all other digesters of the series can be controlled. Suitable valves $v$ are used in the steam pipe connections $p$ to control the admission and exhaust of the steam used for heating the digesters, the steam being furnished by any suitable form of boilers, as $b$. By withdrawing or otherwise reducing the pressure of the steam going into any digester's drum 46, the temperature of the steam may be varied, as will be understood.

The raw material, whether chips of wood, straw, grass, or other material, is fed, in the apparatus illustrated herewith, in measured quantities or gradually and not in bulk, and such material progresses as slowly through the series of digesters to the discharge nozzle 9. At the same time that the raw material is fed into the pipe 48, in the instance illustrated, a measured quantity of the chemicals is also fed in and mingled with the raw material, with or without preheating of either or both chemical and raw material. That is to say, measured quantities of raw material and of the chemicals are fed into the first digester of the series, either already mingled or mingled at the time of delivery to the apparatus. The chemicals used may be alkaline or acid in nature, according to the type of process used.

*Feeding apparatus.*—The inlet tube 48 is shown as connecting with a vertically-disposed tube 52, which tube 52 is provided with a rotary valve 53 for controlling the passageway of tube 52. Below the valve 53 the tube 52 ends directly above and in substantial contact with the tip of a rotary table, 54, which table is provided with a series of spaced openings 55 of uniform into alinement, one by one, with the tube 52 as the table is operated in step by step manner. The table 54 has a stud 56 on the underside thereof, which stud fits into a hole in the fixed plate 57 (or this arrangement may be inverted,) and rotates on the axis so formed, anti-friction devices, as balls 58, being used if desired, between the table 54 and the plate 57. The periphery of the circular table is provided with ratchet-teeth 59, the number and spacing of which correspond with the holes 55. A pawl 60, pivoted on a lever 61, coacts with said teeth to give a step by step motion to the table 54. The lever 61 is fulcrumed at 62, on an arm 63 attached to the underside of the platform or plate 57. The lever 61 extends beyond its fulcrum and on such extension is provided with a roller 64 for coaction with a cam 65. The cam is carried by the vertical shaft 66, which shaft is journaled in an arm 67 fixed to the underside of the plate or table 57 and in a bracket 68 on the frame work 69, the said shaft being provided with a bevel gear 70 by which it is driven from the main shaft 71 by a bevel gear 72. The raw material, in fragmentary form such as chips of wood is placed upon the fixed and the movable tables 57 and 54 and the openings 55 are filled with it by an operator, the table 57 underneath preventing the material from falling through. At a point directly under the tube 52, the table 57 is provided with an opening 73 below which a ram-guide 74 is attached to the underside of the table 57. A ram or piston 75 fits and works in said guide 74, and is adapted to pass through the opening 73 and an opening 55 into the tube 52 to and through the rotary valve 53, which valve is provided with a cylindrical opening 76 for this purpose, whereby the raw material measured by the opening or pocket 55 is carried into the tube 52 to a point above the valve 53, the said valve 53 being rotated at the proper time to cause its opening 76 to register with the tube 52. The ram 75 fits snugly in its tubular guide 74 and is also packed; consequently, it compresses air in moving into the tube 52, and such tube 52 is provided with a hole or so (see reference 52$^x$) so located therein that the degree of compression of the air (including the air in the hole 76) by the ram will equal or exceed the hydrostatic heat against which the feeding takes place. As the ram stops at a point flush with or just above the circle of the valve 53, a holder or retainer 77 (Figs. 13 and 14) is moved across its end-face and so is interposed between the ram-end and the raw material, after which the ram retreats, leaving said detent or holder 77 to support the material above it. The holder is provided with an edge to fit the contour internally of the tube 52, and by preference has a beveled front edge 78 to enable it to pass under the raw material with greater ease. The tube 52 is provided with a slot 79 for the plate-detent 77 to rest upon. The detent 77, which may or may not be imperforate, is carried and moved by a shaft 80, to which an endwise to and fro motion is imparted by a cam 81, or other suitable mechanism, at suitable times. Air under compression greater than the hydrostatic head at the detent 77 may be, and preferably is, admitted at the same time that the ram begins to retreat by means of the pipe 82, and so aid in supporting the detent 77, it being understood that the air is under pressure sufficiently great to compensate for the increasing volume left by the ram as it retreats until the valve 53 rotates and closes. Such air so admitted will tend to blow through any openings in or around the edge of the detent 77 and so to hold back any liquid tending to come down there.

As soon as the valve 53 closes, the detent 77 may withdraw and allow the air to bubble upward. The admission of the air may be automatic, the pipe 82 being provided with a valve at 83, the stem 84 of which valve has an arm 85 rigid therewith; the arm 85 connects with a slotted lever 86 which is fulcrumed at 87 on a bracket 88 of the frame work. The lever 86 connects by a slot and pin 89 with the slide 90, which slide has arms 91, 92 thereon. The reciprocating rod 93, which operates the ram 75, also operates the said slide 90 as follows:—The rod 93 has fast thereto one end of a spring 94, which spring is provided with a roller 95 and an arm 96, while one of the guides 97 for the sliding rod 93 is provided with a cam 98 for coaction with the roller 95, there being dwells or parts on said guide 97 at each side of the ram 96. The arm 96 is provided with a pin 99, which is adapted to coact with the arms 91, 92 of the slide 90 to move said slide 90 in both directions, as follows: On the up-motion of the rod 93 (which is the working stroke of the ram 75,) the pin 99 passes by the lower arm 92 of the slide, being held out of operative relation thereto by the dwell 98$^x$ at such time, but, after passing by the arm 92 as stated, said pin 99 then passes the cam 98 and is moved by the spring 94 over into position such that, on the rise of the pin 99 to the arm 91, such pin will strike the arm 91 and lift the slide 90, which slide is held in position by the friction of the valve at 83 and of other parts, and, through the described connections, opens said valve 83 for the admission of air in the manner above set forth. At the same time, the arm 92 is moved upward so far that the pin 99, on the down-motion of the rod 93, will coact with such arm 92 and move the slide 90 to close the valve at 83 and so shut off the supply of compressed air, after which the cam 98 moves the pin 99 out of connection with the arm 92, the spring 94 bending to allow the pin 99 to be held momentarily, as the arm 92 reaches the limit of its motion downward, after which the pin 99 slips off the end of the arm 92 and the spring 94 snaps the pin 99 back to its normal position.

The slide-rod 93 is provided with a roller 100 100 which works in a grooved cam 101 which is fast on the main shaft 71, and said cam is shaped to move the ram upward with a short period of rest or slowing down as the valve 53 opens, after which the ram again advances to the full limit of its stroke and pushes the raw material through the valve and into the tube 52 to a point where the detent 77 can slide across and in contact with the end of the ram and so take the raw material while the ram retreats.

In order to cause exact registration of the pockets 55 with the tubes 52 and 74 and to lock the table 54 against the motion while the ram is above the opening 73, the periphery of the table is notched at intervals, as indicated at 22. These notches correspond in number and position with the said pockets 55, and a reciprocatory dog 103 is provided, for coaction with said notches to both center and lock the table 54 at the times stated. The dog 103 extends downwardly through a guide 104 and between guides 105, and is provided with a roller 106 for coaction with a cam 107 on the main shaft 71. A spring 108, acting between the guides 104 and a collar 109 on the rod dog 103, keeps the roller 106 on the cam 107. The operation here is that the pawl 60 first turns the table 54 to bring a pocket 55 thereof over the opening 73 (which is closed by the ram 75,) whereupon the cam 107 moves the dog 103 upward into engagement with the corresponding notch 102 and thereby centers and locks the table 54 with the pocket 55 in exact alinement with respect to the tubes 52 and 74, and only releases the table after the ram has reached the pocket on its retreat and is partly in the tube 74.

The valve 53 is operated, in the instance illustrated, by means of a gear 110 on the valve-stem 111, and a reciprocating rack-bar 112 which works in guides 113 on the framework, and is provided with a roller 114 fitting in a grooved cam 115 fast on the main shaft 71. The parts are so timed that the valve 53 opens after the ram 75 has moved part way up, or when the dwell 101$^x$ of the cam 101 is in engagement with the roller 100, and said valve 53 closes as soon as the ram 75 on its retreat clears the valve.

The operation of the above-described apparatus for feeding the raw material has been indicated at intervals above, but it may be summarized as follows:—The raw material is thrown on top of the tables 54 and 57, a felt or other suitable packing ring 116 being used between the fixed and the moving table to prevent the material from dropping into the crack between them, and the operator fills the pockets 55, any surplus at any pocket being scraped aside by the tube 52 as the table is revolved to bring that pocket under said tube 52. Then the material is fed into the upper part of the tube 52 gradually by succeeding batches of material and so on into the admission-port 13 of the digester 1, and thence it progresses through the various digesters to the discharge nozzle 9 as the ram 75 keeps on acting and feeding in more material; at the same time that the ram feeds in the raw material, the chemicals are injected, in measured quantities, through the pipe 117 and mingle with the material in the passage way.

Each working stroke of the ram feeds in a measured quantity of the raw material which the detent 77 prevents from following the ram as it retreats. As the ram reaches the upper end of its working strokes, the toe or pin 99 moves the slide 90 and so opens the valve at 83 and admits air under pressure against the side of the ram, which air passes between the ram and the detent 77 as the ram retreats. The raw material and the chemicals thus slowly or gradually introduced into the first digester are slowly forced upward through the inclined digesters to the point of discharge, the gates 30 being opened, closed and set as occasion may require, or being adjusted to positions such that, in each digester the material being cooked in it shall have the proper length of cooking. It will be noted that, by the provision of the gate-valves 30 and the described connections, the time of passage of a given amount of material and chemicals through a given digester may be varied, even if the delivery of the raw material to the first digester is not stopped for the time being; and by stopping such delivery of the raw material and the chemicals, the time of digestion may be prolonged, should tests of the solid matter in any digester indicate the advisability of necessity for so doing. For the purpose of drawing off small quantities of the fibrous material in a digester, the digesters are provided with drawoff pipes and cocks 118, placed in the connections 8 near the valves 30 thereof. The amount of mixed material and chemicals in any digester may be varied by exhausting the air from the pocket formed by the upper shoulder or corner where the coned end joins the cylindrical body, as by means of the pipe $z$ which extends upwardly into such pocketed air at $y$ and through the walls of the connection 8 to the outside where it is provided with a valve $v$ and thence back through the walls of the connection 8 at the other side of the valve 30 and down into the next digester of the series, thus allowing more of the material to be forced into such exhausted digester; or, to state it otherwise, detaining the material therein while it is being cooked, without stopping the feeding in of raw material and chemicals at the admission-port of the first digester, the valve 30 at the upper end of the digester in which the material is to be detained being closed for the time being. By closing the valve $v$ in pipe $z$ air is allowed to accumulate in the pocket at $y$ and thus force out more quickly the detained material from such pocket at $y$. Thus the process of conversion may be ascertained and regulated from time to time at each digester, and incorrect work be corrected by adding chemicals at the place where the necessity thereof is indicated, or by prolonging or shortening the time of digestion in a particular digester, or otherwise, as the case may be. The process of conversion begins in the first digester with strong chemicals and strong heat, the object being to heat quickly and to saturate thoroughly the raw materials and then to force them on to the next digester, but after the material has reached the fourth digester in the series, the heat is materially lowered and the chemicals slightly strengthened, pipes 117 being provided at each connection 8 for the purpose of introducing such chemicals at will, valves being used to close the pipes 117 when those are not in use, while, at the next to the last digester in the series (the sixth in the case illustrated,) the solution is weakened slightly by the addition of water, the twofold object here being to gelatinize in part the woody fiber and to cool the batch so that when it enters the last digester of the series it is pretty well disintegrated, this last digester should revolve more rapidly than any other of the digesters, thereby agitating the mass of material therein more than does any other digesters, in order that the material may more readily disintegrate and blend into a uniform consistency, so that, as it is delivered into the cooling nozzle 9 at the end of the last digester, it will be separated and evenly gelatinized. Each digester is rotated at its own speed in its cradle while the cooking is in progress, thereby agitating the mixed material and chemicals and more evenly distributing the heat therethrough, and so promoting evenness of chemical action. This gelatinization does not mean the reduction of the fiber to an amorphous condition. The structure of the fiber is retained as much as possible. Some small portion of the fiber is reduced to such a condition, and this, blending with the other, helps to keep the pulp smooth and even, as is well understood in the art.

The speed of the ram 75 which delivers the raw material into the first digester is governed by the pressure of the steam in the heat zone drum located in the interior of the first digester, and, of course, the pressure of the steam is in a fixed ratio to its temperature, which, in turn determines how much material is acted upon in a given time. Further regulation may be accomplished by means of a disk-valve V, which is held in balance between steam from the boiler $b$ and air-pressure from the tank T, said valve V being arranged, by means of its stem 119 and the lever 120 to operate the rheostat $r$ in the circuit 121 of the electric motor M, which motor driver the air-compressor C by means of a belt 122, and also drives the main-shaft 71 by means of a belt 123 and a pulley 124 on said main-shaft. It will be seen, from this arrangement, that there is brought about a regulation of the feed of the raw material to the digester in ratio to the temperature of the steam which bears directly upon the period of time necessary for the raw material to be in the first digester before it is forced on to the second digester, so that if the steam is kept at a uniform pressure the ram will deliver a fixed quantity of raw material per minute into the first digester, and the same mechanism which controls the ram also controls the valve that injects the chemical solutions into the first digester. All the factors relating to the flowing of the mixed material and chemicals being thus under the control of the steam-pressure, it is equivalent to saying that they are controlled by the temperature of the steam-drum in the first digester.

Assuming that the plant has been in operation for a period of time sufficient to have filled all the digesters, which means a period of about fourteen hours, and that the pulp has begun to flow from the nozzle 9, and the indications were of insufficient treatment, the feeding in is stopped and the closing of a valve 30 at the nozzle 9 locks all of the batch in the various digesters and the cooking can go on until the proper consistency has been secured. If the pulp comes through "hairy" and overcooked, an increase of speed at the ram 75 and the cutting off of steam with the introduction of water in the last digester will effectually stop further disintegration of the pulp, but whenever the apparatus has been regulated so as to produce pulp of the desired quality, it can be kept going in that condition.

A secondary purpose of my invention is the washing of the pulp and the separation therefrom of the waste liquor so as to recover the solids, the chemicals from which, in the soda process are used again, and which, in the sulfite process, I utilize in various ways in the manufacture of useful articles. Referring more particularly to the sulfite process, as there is a constant delivery of the cooked pulp at the nozzle 9, in small quantity, it is easy to wash, cleanse or otherwise prepare the pulp for future use, while at the same time the strong sulfite can be separated from the weaker sulfite waste liquor, and be used in the production of many useful things. As the pulp and the solutions fall from the nozzle 9 into the first compartment $a$ of the beater-tank 51, water from a rose $r^x x$ is sprinkled upon it, only enough water being used to make the pulpy mass sufficiently fluid to control it in the first compartment $a$ of the beater, the object here being to break up, and separate the fibrous constituents of the wood so that it will be uniform in consistency. The beater blades 127 are carried by shafts 128, which shafts are journaled in bearings on the edges of the tank 51, and are driven in the direction indicated by the arrows by any suitable mechanism (not shown.) The baffles 129 divide the beater 51 into a series of compartments $a$, $b$, $c$, etc., each compartment having its own set of beater-blades 127. There is a water rose $r^x x$ for each compartment of the beater, all said roses being connected with a water pipe 130, by branches that have valves $v$ therein. The revolving blades 127 beat the mass in compartment $a$ and also carry it gradually over the baffle 129 into compartment $b$, while much of the strong liquor and the contained dissolved constituents of the original raw material drains off through a drain 131 in the bottom of the compartment $a$, a pipe 132 being used to convey the same to an evaporator 133. Each compartment of the beater may be connected with the pipe 132 in the manner shown above, the branch pipe connecting the compartments with the pipe 132 having valves 134 therein, so that the liquor can be drawn off or not from each compartment, as may be desired. In practice, however, the liquor from those compartments where the liquor is strong enough to warrant its use in the tank or evaporator 133 and subsequently in the manufacture of useful articles, will be drawn to said evaporator 133. The pulp in this is beaten in each tank with a fresh supply of water, and is, or may be, delivered over an apron 135 into the buckets 136 of a traveling conveyer 137, after being washed and cleansed in the process above set forth. The weaker sulfite waste is drawn off independently of the pipe 132 and is thrown aside. The sulfite waste that is taken to the evaporator 133 contains much of the sulfur and the lime compounds, together with the primitive lignincellulose, the primitive and formative cells, protoplasm, resins and other secretions of the wood and such of the matured cells as may have been dissolved in the process of digestion. The tank 133 may be heated in any convenient manner, or by means of steam in the space 138 in the double bottom 139 of the tank 133.

The raw material and chemicals may proceed from the uppermost digester of a series downward to a discharge at the lower end of a lowermost digester, and the feed of the raw material may be from below the upper end of the uppermost digester. Or the feed may be from above as indicated at Fig. 14, where the ram 75 moves in a tube 74* down through an opening or openings in a reciprocatory table 54* into a tube 52* and through the valve 53 thereof, and it is remarked that if the feed in this case is into the lower end of the lowermost digester the detent 77 is used to prevent the raw material and the chemicals from following the ram upward as it retreats before the valve 53 closes.

In lieu of dropping the pulp and the chemicals direct to the beater 51 from nozzle 9, that nozzle may be connected by a pipe 140 with a chamber 141 (shown as spherical, see Fig. 15, but which may be otherwise shaped) and so discharges into such chamber. This chamber has a steam outlet 142 above and an outlet 143 below for solids and liquids, and is provided with an annular pipe 144, which pipe has perforations 145 therein at the upper inside part thereof, whereby water is thrown upward and inward of the chamber to meet the falling pulp and chemicals and mingle therewith as all fall into the tank 51.

In order to be able to remove any digester of the series for repairs or substitution by another digester without disturbing the other digester, I prefer to attach the sleeves 14 to flanged ends 146, and to connect such flanged ends by removable bolts and nuts 147 to flanges 148 on the tubular connections, as 8, by which material and chemicals are conveyed to and from the digesters, and to support the steam-pipes 45 and 27 as well as the pipes z wholly from said flanged ends 146. By disconnecting the steam pipes 45 and 47 from the service pipes and by removing the valves v in the pipes z and then removing and securing bolts and nuts 147, the digester is wholly disconnected from the relatively fixed tubular connections, as parts, 48, 8 and 49, and may be lifted from its cradle and taken away without disturbing in the least any of the remaining digesters, and such removed digester may be replaced or be substituted by another without disturbing the remainder of the digesters, and its steam and air connections be reconnected, after which the apparatus is ready for use. This, it will be seen, constitutes a valuable feature in that it minimizes delay, without consequent loss of production, and provides a convenient method of removal for repairs of the like of a damaged digester and also permits the substitution of a new digester with a minimum of delay and expense.

This invention is not limited to the manufacture of pulp for making paper, nor to the sulfite process, for the pulp may be used to make carton, boards, vessels, shapes etc., the same as any other pulp. Nor is the method of digestion limited to what is known as "print" or newspaper for it is also important in making what is known in the trade as "book paper," in which the raw material is composed of sulfite pulp, soda pulp, old books and the like, or a proportion of rag in lieu of the old books and the like. After the composition for the book paper has been mixed and shredded and proportioned in accordance with the working formula, the material or mass is passed into digesters in substantially the same manner that the shredded wood chips are introduced as hereinbefore set forth, and the proper solvent is added in substantially the same manner as in the bisulfite process above described of reducing wood chips to pulp.

What I claim as new and desire to secure by Letters Patent of the United States is—

1. The herein described method of making pulp for use in paper making consisting in heating the material and the chemicals together in each of a series of digesters for lengths of time insufficient to cause complete digestion in any one digester and moving the material and the chemicals without exposure to the atmosphere from digester to digester until the process of digestion is substantially complete.

2. The herein described method of making pulp for use in paper making consisting in heating the material and the chemicals together in each of a series of digesters for lengths of time insufficient to cause complete digestion in any one digester and moving the material and the chemicals without substantial cooling or exposure from digester to digester of the series until the process of digestion is substantially complete.

3. The herein described method of making pulp for use in paper making consisting in heating the material and the chemicals together in each of a series of digesters for lengths of time insufficient to cause complete digestion in any one digester, agitating the mass in certain of said digesters during such heating, and moving the material and the chemicals from digester to digester until the process of digestion is substantially complete.

4. The herein described method of making pulp for use in paper making consisting in heating the material and the chemicals together in each of a series of digesters for lengths of time insufficient to cause complete digestion in any one digester, agitating the mass in certain of said digesters during such heating, and moving the material and the chemicals without exposure to the atmosphere from digester to digester until the process of digestion is substantially complete.

5. The herein described method of making pulp for use in paper making consisting in heating the material and the chemicals together in each of a series of digesters for lengths of time insufficient to cause complete digestion in any one digester, agitating the mass in certain of said digesters during such heating, and moving the material and chemicals without substantial cooling or exposure from digester to digester of the series until the process of digestion is substantially complete.

6. The herein described method of making pulp for use in paper making consisting in heating the material and the chemicals together in each of a series of digesters for lengths of time insufficient to cause complete digestion in any one digester and moving the material and the chemicals from digester to digester until the process of digestion is substantially complete, and aerating them during the process of digestion.

7. The herein described method of making pulp for use in paper making consisting in heating the material and the chemicals together in each of a series of digesters for lengths of time insufficient to effect complete digestion in any one digester and moving the material and the chemicals from digester to digester until the digestion is substantially complete, and in part gelatinizing the material as the process nears completion.

8. The herein described method of making pulp for use in paper making consisting in heating the material and the chemicals together in each of a series of digesters for lengths of time insufficient to cause complete digestion in any one digester and moving the mixed material and chemicals from digester to digester, aerating the mixed material and chemicals during the process, and in part gelatinizing the material as the process of digestion nears completion.

9. The herein described method of making pulp for use in paper making consisting in heating the material and the chemicals together in each of a series of digesters for lengths of time insufficient to cause complete digestion in any one digester until the process of digestion is substantially complete, and agitating and aerating the mixed material and chemicals during the process of digestion.

10. The herein described method of making pulp for use in paper making consisting in heating the material and the chemicals together in each of a series of digesters for lengths of time insufficient to cause complete digestion in any one digester and moving the material and the chemicals from digester to digester until the process of digestion is substantially complete, agitating the mixed material and chemicals during the process of digestion, and in part gelatinizing the material as the process of digestion nears completion.

11. The herein described method of making pulp for use in paper making consisting in heating the material and the chemicals together in each of a series of digesters for lengths of time insufficient to cause complete digestion in any one digester and moving the material and the chemicals from digester to digester until the process of digestion is substantially complete, agitating and aerating the mixed material and chemicals during the process, and in part gelatinizing the material as the process of digestion nears completion.

12. The herein described method of making pulp for use in paper making consisting in heating the material and the chemicals together in each of a series of digesters for lengths of time insufficient to cause complete digestion in any one digester and moving the material and the chemicals without exposure to the air from digester to digester to complete the process of digestion, and aerating the mixed material and chemicals during the process of digestion.

13. The herein described method of making pulp for use in paper making consisting in heating the material and the chemicals together in each of a series of digesters for lengths of time insufficient to cause complete digestion in any one digester and moving the material and the chemicals from digester to digester to complete the process of digestion without exposing them to the atmosphere, and in part gelatinizing the material as the process of digestion nears completion.

14. The herein described method of making pulp for use in paper making consisting in heating the material and the chemicals together in each of a series of digesters for lengths of time insufficient to cause complete digestion in any one digester and moving the material and the chemicals without contact with the atmosphere from one to another of said digesters to complete the process of digestion, agitating the mixed material and chemicals during the process of digestion, and in part gelatinizing the material as the process of digestion nears completion.

15. The herein described method of making pulp for use in paper making consisting in heating the material and the chemicals together in each of a series of digesters for lengths of time insufficient to cause complete digestion in any one digester and moving the material and the chemicals without substantial cooling thereof from digester to digester to complete the process of digestion, and in part gelatinizing the material as the process of digestion nears completion.

16. The herein described method of making pulp for use in paper making consisting in heating the material and the chemicals together in each of a series of digesters for lengths of time insufficient to cause complete digestion in any one digester and moving the material and the chemicals without substantial cooling thereof from digester to digester to complete the process of digestion aerating the same during the process of digestion, and in part gelatinizing the material as the process of digestion nears completion.

17. The herein described method of making pulp for use in paper making consisting in heating the material and the chemicals together in each of a series of digesters for lengths of time insufficient to cause complete digestion in any one digester and moving the material and the chemicals without substantial cooling thereof from digester to digester to complete the digestion, and aerating the same during the digestion thereof.

18. The herein described method of making pulp for use in paper making consisting in heating the material and the chemicals together in each of a series of digesters for lengths of time insufficient to cause complete digestion in any one digester and moving the material and the chemicals without substantial cooling and without exposure thereof to the atmosphere from digester to digester to complete the digestion, and aerating the same during the digestion.

19. The herein described method of making pulp for use in paper making consisting in heating the material and the chemicals together in each of a series of digesters for lengths of time insufficient to cause complete digestion in any one digester and moving the material and the chemicals without exposure thereof to the atmosphere and without substantial cooling thereof from digester to digester to complete the digestion, aerating the same during the process of digestion, and in part gelatinizing the material as the digestion nears completion.

20. The herein described method of making pulp for use in paper making consisting in feeding the raw material and the chemicals little by little into the first of a series of connected digester and on through the entire series and heating the same together in each digester for a length of time insufficient to cause complete digestion in any one digester and the aggregate time sufficing to complete digestion, and aerating the mixed material and chemicals during the process.

21. The herein described method of making pulp for use in paper making consisting in feeding the raw material and the chemicals little by little into the first of a series of connected digesters and on through them and heating the same together in each digester for a length of time insufficient to cause complete digestion in any one digester, the whole time sufficing for complete digestion, and in part gelatinizing the material as the process nears completion.

22. The herein described method of making pulp for use in paper making consisting in feeding the raw material and the chemicals little by little into the first of a series of connected digesters and on through them and heating the same together in each digester for a length of time insufficient to cause complete digestion in any one digester, the whole time sufficing for substantially complete digestion, aerating the same during the process of digestion, and in part gelatinizing the material as the process of digestion nears completion.

23. The herein described method of making pulp for use in paper making consisting in feeding the raw material and the chemicals little by little into the first of a series of connected digesters for a length of time insufficient to cause complete digestion in any one digester, the whole time sufficing for substantially complete digestion, agitating and aerating the same during the process of digestion, and in part gelatinizing the material as the process of digestion nears completion.

24. The herein described method of making pulp for use in paper making consisting in feeding the raw material and the chemicals little by little into the first of a series of connected digesters and on through them and heating the same in each digester for a length of time insufficient to cause complete digestion in any one digester, the whole time sufficing for substantially complete digestion, and agitating the mixed material and chemicals during the process of digestion.

25. The hereindescribed method of making pulp for use in paper making consisting in feeding the raw material and the chemicals little by little into the first of a series of digesters and heating the same in each digester for lengths of time insufficient to cause complete digestion in any one digester and moving the material and the chemicals from digester to digester to complete the process of digestion.

26. The herein described method of making pulp for use in paper making consisting in feeding the raw material and the chemicals little by little into the first of a series of digesters and moving the same from digester to digester without exposure to the atmosphere and heating the same in each digester for length of time insufficient to cause complete digestion in that digester.

27. The herein described method of making pulp for use in paper making consisting in feeding the raw material and the chemicals little by little into the first of a series of digesters and moving the same from digester to digester without exposure to the atmosphere heating the same in each digester for a length of time insufficient to cause complete digestion therein, the whole time sufficing for substantially complete digestion, and aerating the mixed material and chemicals during the digestion.

28. The herein described method of making pulp for use in paper making consisting in feeding the raw material and the chemicals little by little into the first of a series of digesters and moving the same without exposure to the atmosphere from digester to digester to complete the process of digestion, heating the same in each digestion for a length of time insufficient to cause complete digestion therein, the whole time sufficing for substantially complete digestion, and aerating and agitating the mixed material and chemicals during the process of digestion.

29. The herein described method of making pulp for use in paper making consisting in feeding the raw material and the chemicals little by little into the first of a number of digesters and moving the same without exposure to the atmosphere from digester to digester to complete the digestion, heating the same in each digester for a length of time insufficient to cause complete digestion therein, and agitating the mixed material and chemicals during the digestion.

30. The herein described method of making pulp for use in paper making consisting in digesting the material in independently-operable stages without exposure.

31. The herein described method of making pulp for use in paper making consisting in digesting the material in independently-operable stages without exposure, and in part gelatinizing the same during the last stages.

32. The herein described method of making pulp for use in paper making consisting in digesting the material in independently-operable stages, aerating the same during such treatment, and in part gelatinizing the material during a last stage.

33. The herein described method of making pulp for use in paper making consisting in digesting the material in independently-operable stages, agitating the same during such treatment, and in part gelatinizing the material during a last stage.

34. The herein described method of making pulp for use in paper making consisting in digesting the material in independently-operable stages, aerating and agitating the same during such treatment, and in part gelatinizing the material during a last stage.

35. The herein described method of making pulp for use in paper making consisting in flowing the mixed row material and chemicals past and in contact with a number of independent heating surfaces and heating them thereat.

36. The herein described method of making pulp for use in paper making consisting in flowing the mixed raw material and chemicals past and in contact with a number of independent heating surfaces and heating them thereat and agitating them otherwise than by said flowing motion.

37. The herein described method of making pulp for use in paper making consisting in flowing the mixed raw material and chemicals past and in contact with a number of independent heating surfaces, heating them at such surfaces, and aerating them during the process.

38. The herein described method of making pulp for use in paper making consisting in flowing the mixed material and chemicals past and in contact with independent heating surfaces, heating them thereat, agitating them otherwise than by said flowing motion, and aerating them during the process.

39. The herein described method of making pulp for use in paper making consisting in flowing the mixed material and chemicals past and in contact with a number of independent heating surfaces, heating them thereat, and in part gelatinizing the material as the process of digestion nears completion.

40. The herein described method of making pulp for use in paper making consisting in flowing the mixed material and chemicals past and in contact with a number of independent heating surfaces, heating them thereat, agitating them otherwise than by the flowing motion, and in part gelatinizing the material as the process of digestion nears completion.

41. The herein described method of making pulp for use in paper making consisting in flowing the mixed material and chemicals past and in contact with a number of independent heating surfaces and heating them thereat, aerating them during the process, and in part gelatinizing the material as the process of digestion nears completion.

42. The herein described method of making pulp for use in paper making consisting in flowing the mixed material and chemicals past and in contact with a number of independent heating surfaces, heating them thereat agitating them otherwise than by the flowing motion, aerating them during the process of digestion, and in part gelatinizing the material as said process nears completion.

43. The herein described method of making pulp for paper-making purpose consisting in flowing the raw material and the chemicals past and in contact with independent heating surfaces, heating them together thereat, removing samples of the material to ascertain its condition and thereafter adjusting the heating condition at certain of said surfaces.

44. The herein described method of manufacturing pulp, consisting in flowing the mixed raw material and chemicals past and in contact with more than three independent heating surfaces and heating them thereat at temperatures higher at the first two surfaces than at the last two surfaces.

45. The herein described method of manufacturing pulp, consisting in flowing the mixed raw material and chemicals past and in contact with independent heating surfaces and heating them thereat at temperatures higher at the first two heating surfaces than at the last two surfaces, and agitating them otherwise than by said flowing motion.

46. The herein described method of manufacturing pulp consisting in flowing the mixed raw material and chemicals past and in contact with independent heating surfaces and heating them thereat at temperatures higher than at the last two surfaces, and aerating them during the process.

47. The herein described method of manufacturing pulp consisting in flowing the mixed material and chemicals past and in contact with more than three heating surfaces and heating them thereat at temperatures higher at the first two surfaces than at the last two surfaces, agitating them otherwise than by said flowing motion, and aerating them during the process.

48. The herein described method of manufacturing pulp consisting in flowing the mixed raw material and chemicals past and in contact with more than three heating surfaces and heating them thereat at temperatures higher at the first two surfaces than at the last two surfaces, and in part gelatinizing the material as the process of digestion nears completion.

49. The herein described method of manufacturing pulp consisting in flowing the mixed raw material and chemicals past and in contact with more than three heating surfaces and heating them thereat at temperatures higher at the first two surfaces than at the last two surfaces, agitating them otherwise than by the flowing motion, and in part gelatinizing the material as the process of digestion nears completion.

50. The herein described method of manufacturing pulp consisting in flowing the mixed raw material and chemicals past and in contact with more than three independent heating surfaces and heating them thereat at temperature higher at the first two surfaces than at the last two surfaces, aerating them during the process, and in part gelatinizing the material as the process nears completion.

51. The herein described method of manufacturing pulp consisting in flowing the mixed raw material and chemicals past and in contact with more than three indepent heating surfaces and heating them thereat at temperatures higher at the first two surfaces than at the last two surfaces, agitating them otherwise than by the flowing motion, aerating them during the process, and gelatinizing the material as the process nears completion.

52. The herein described method of making pulp, which consists in feeding the raw material and chemicals past and in contact with each of a series of independent heaters whereby said pulp and chemicals are heated in successive steps, and maintaining the temperature of the last heater of the series at not more than 300° F.

In testimony whereof I affix my signature, in the presence of two subscribing witnesses.

WALTER K. FREEMAN.

Witnesses:
M. O. George,
Clarence W. Hodge.